United States Patent [19]

van de Berg et al.

[11] Patent Number: 5,045,230

[45] Date of Patent: Sep. 3, 1991

[54] THICKENING AGENTS FOR AQUEOUS SYSTEMS

[75] Inventors: Albert van de Berg, Kreuzau; Doris Fitzek, Titz, both of Fed. Rep. of Germany

[73] Assignee: Akzo NV, Arnhem, Netherlands

[21] Appl. No.: 399,201

[22] Filed: Aug. 28, 1989

[30] Foreign Application Priority Data

Sep. 2, 1988 [DE] Fed. Rep. of Germany ....... 3829839

[51] Int. Cl.$^5$ .................. B01J 13/00; C08G 59/40; C08G 65/34; C07C 43/00
[52] U.S. Cl. .................. 252/310; 252/315.1; 252/73; 528/110; 528/406; 568/606; 568/608; 568/625
[58] Field of Search .............. 252/310, 315.1, 316, 252/73; 528/110, 104, 406; 568/606, 608, 625

[56] References Cited

U.S. PATENT DOCUMENTS

| 3,538,033 | 11/1970 | Hayashi et al. | 252/310 |
| 3,639,240 | 2/1972 | Mutchler | 252/52 R |
| 3,736,288 | 5/1973 | Stratta et al. | 523/175 |
| 3,856,691 | 12/1974 | Haugen et al. | 252/52 R |
| 4,102,795 | 7/1978 | Minegishi et al. | 252/8.9 |
| 4,115,457 | 9/1978 | Wiedemann | 568/625 |
| 4,288,639 | 9/1981 | Camp | 252/315.1 |
| 4,312,775 | 1/1982 | Panek et al. | 252/316 |
| 4,373,034 | 2/1983 | Speranza et al. | 521/177 |
| 4,479,887 | 10/1984 | Seibert | 252/309 |
| 4,524,003 | 6/1985 | Borchardt | 252/8.551 |
| 4,606,837 | 8/1986 | McEntire et al. | 252/73 |
| 4,774,017 | 9/1988 | Seibert et al. | 252/174.12 |
| 4,971,722 | 11/1990 | Philippsen | 252/315.1 |

FOREIGN PATENT DOCUMENTS

| E18251B | 5/1986 | Austria . |
| 0260430 | 3/1988 | European Pat. Off. . |
| 2401904 | 7/1979 | Fed. Rep. of Germany . |
| 2225318 | 5/1972 | Netherlands . |
| 1480432 | 7/1977 | United Kingdom . |
| 2083059 | 3/1982 | United Kingdom . |

Primary Examiner—A. Lionel Clingman
Assistant Examiner—J. E. Darland
Attorney, Agent, or Firm—David H. Vickrey; Louis A. Morris

[57] ABSTRACT

Thickening agents for aqueous systems are prepared by reacting aliphatic alcohols containing 8 to 22 carbon atoms with an ethylene oxide/propylene oxide mixture, then reacting the resulting polyether with 5 to 20 moles of ethylene oxide, and reacting the resulting alkoxylation product with a diepoxide, with 0.5 to 3 moles of alkoxylation product being used in the combination reaction per mole of diepoxide. The thickening agents may be blended with low molecular weight alcohol ethoxylates, and are especially suitable for hydraulic fluids.

14 Claims, No Drawings

THICKENING AGENTS FOR AQUEOUS SYSTEMS

The invention relates to liquid thickening agents for aqueous systems which are prepared by the alkoxylation of higher aliphatic alcohols with ethylene oxide and propylene oxide to alcohol alkoxylates capped with ethylene oxide and the reaction of the alkoxylated alcohols with diepoxides, a process for the preparation thereof, and the use of same in aqueous systems.

BACKGROUND OF THE INVENTION

It is known to alkoxylate higher alcohols having 8–22 carbon atoms with ethylene oxide or propylene oxide or with mixtures of the two alkylene oxides and subsequently to convert the resulting alkoxylated product with diepoxides. Using such products it is possible to prepare aqueous solutions of a high viscosity. In DE 3134494, thickeners are made by single or plural reaction of an alcohol or a diol with ethylene oxide, propylene oxide or mixtures thereof and subsequent reaction with a diepoxide. In the examples of DE 3134494, the EO/PO mixtures are in a weight ratio of about 1:3 and the diepoxide used is vinylcyclohexane diepoxide (VCH). The preparation of such alkoxylated alcohols and their suitability as thickening agents are also disclosed in U.S. Pat. Nos. 3,538,033 and 4,102,795. U.S. Pat. No. 3,538,033 relates to thickeners obtained by reaction of aliphatic alcohols with ethylene oxide and subsequent reaction with a diepoxide such as limondiepoxide or VCH. The obtained products are solid and therefore difficult to handle. U.S. Pat. No. 4,102,795 discloses a fabric or hair softener containing a quaternary ammonium compound, water and a product obtained by reaction of an aliphatic alcohol with ethylene oxide, propylene oxide or mixtures thereof followed by reaction with a compound such as VCH.

The reaction of alcohols with ethylene oxide/propylene oxide mixtures leads to polyethers with different reactive terminal OH groups, with the ratio of primary OH groups to secondary OH groups being dependent on the reaction conditions. Since the composition of the later products formed by reaction of the alkoxylates with diepoxides is basically dependent on the type of hydroxyl terminal group of the alkoxylates, and variations in reaction conditions (e.g., temperature, EO/PO ratio) are unavoidable when preparing alkoxylates, it is difficult to prepare products of reproducible composition and quality.

Highly effective polyether-based thickening agents display in, e.g., water a great dependence of viscosity on temperature, which within the field of application of nonflammable hydraulic fluids presents a major drawback.

Therefore, there is still need for the preparation of a thickening agent that has reproducible properties, is universally suited to be used for the thickening of different water-based systems, and displays little viscosity-temperature dependence.

SUMMARY OF THE INVENTION

Accordingly, the current invention is a process for the preparation of thickening agents for aqueous systems by the conversion of higher aliphatic alcohols having 8–22 carbon atoms with ethylene oxide and propylene oxide and the reaction of the resulting alkoxylated alcohols with diepoxides, the process comprising (a) reacting the aliphatic alcohols having 8–22 carbon atoms with an alkylene oxide mixture of ethylene oxide/propylene oxide to produce polyether, the alkylene oxide mixture containing more than 15% by weight of propylene oxide in a molar ratio of alcohol to the alkylene oxide mixture of 1:40–1:150, (b) reacting the polyether with 5–20 moles of ethylene oxide to produce an alkoxylation product, and (c) reacting the alkoxylation product with a diepoxide in a ratio of 0.5–3 moles of alkoxylation product per mole of diepoxide. It is advantageous to make use in step (a) of an ethylene oxide/propylene oxide mixture which is 20–30 wt. % of propylene oxide.

In a particularly advantageous embodiment of the process according to the invention there are mixed with the thickening agent after reaction with the diepoxide 0.1–5 parts of a low-molecular weight alcohol ethoxylate per part of thickener. The admixed low-molecular weight alcohol ethoxylates should preferably have a share of 30–70% by weight in the thickening agent/alkoxylate mixture.

Subject matter of the invention also includes thickening agents as a result of the processes described hereinbefore.

Subject matter of the invention further includes mixtures of thickening agents as they can be obtained by the processes described hereinbefore.

Subject matter of the invention is also the use of the thickening agents in aqueous systems, more particularly in aqueous hydraulic fluids, metalworking fluids, emulsions, dispersions, more particularly latex dispersions, aqueous detergent systems, acids, and bases.

It is of advantage to use the thickening agents as mixtures.

DETAILED DESCRIPTION OF THE INVENTION

The preparation of the thickening agent according to the invention may be carried out as follows.

A higher aliphatic alcohol or a corresponding mixture, such as C12/14 H25/29 OH=lauryl myristyl alcohol or C16/C18 H 33/37 OH=tallow alcohol is converted at an elevated temperature of, say, about 140°–180° C. with an ethylene oxide/propylene oxide mixture containing at least 15% by weight of propylene oxide. In this process about 40 to 150, more particularly 60–100 moles of alkylene oxide are brought to reaction per mole of alcohol.

After the alkoxylated product with statistic distribution of the alkylene oxide has been obtained, alkoxylation takes place again in a second reaction, this time, however, using pure ethylene oxide under otherwise identical reaction conditions. Thus is formed an alkoxylated product which exhibits a range with statistic distribution of the EO/PO units, to which is linked a block of ethylene oxide units.

This alkoxylated product is subsequently crosslinked with a diepoxide, such as vinyl cyclohexene dioxide or 1,2,7,8-diepoxy octane. In addition, other diepoxides such as limonene dioxide and diglycidyl ethers such as butane diol diglycidyl ether may be employed.

In the process according to the invention products are formed which are liquid at room temperature, can therefore be pumped and easily fed, and can be worked into water at room temperature without being melted down (see Example 2).

When a thickening agent is used in aqueous systems, it is of great advantage that no solid thickener residues are formed when the water is evaporated, so that there is no incrustation in the equipment or formation of solid deposits. This means that valves, pumps, pipes, and the like are protected and, consequently, costly servicing is not required.

The thickening agent is highly economical, since it is possible to set the desired viscosities already with comparatively small amounts (see Tables 2 and 3). The thickening agents are very hydrolytically stable, so that even at elevated temperatures and longer operating periods there will not be a detrimental decomposition of the polyether, which means that the period of use of the thickening agent can be increased, so that especially in hydraulic plants it will be possible to increase the service life considerably.

The cloud point of aqueous systems containing the thickeners prepared according to the invention is high, so that no problems arise at temperature variations. As is known, thickener systems become inactive above the cloud point.

The thickening agents have a low foam content in aqueous systems, so that the addition of foam removers is largely superfluous. The thickening agents are extremely stable to shear, which enables the thickening agent to be used especially in hydraulic fluids.

Especially advantageous according to the invention are thickening agents consisting of mixtures of at least two thickening agents with different alkyl terminal groups. Such may, e.g., be obtained as follows: first, in separate synthesis steps each time a thickening agent is prepared as described hereinbefore from an alcohol such as lauryl myristyl alcohol or tallow alcohol. The alcohols used each time as starter alcohol are distinguished in the alkyl group by four $CH_2$ groups. It is of advantage when in the preparation of such mixtures use is made of thickening agents in which the alkyl groups are distinguished by at least four $CH_2$ groups. The thickening agents prepared in this manner are subsequently mixed (see Examples 3 and 5).

However, it is also possible to present directly a mixture of the alcohols in question and prepare the thickening agent mixture directly in the synthesis.

It is more advantageous, however, to prepare the individual thickening agents separately first, since in this way there is greater variability in preparing the mixtures.

In this way it is possible to prepare thickening agents with custom-made property profiles which meet the most diversified requirements in the art.

It was particularly surprising to find that the viscosity-temperature profile of the thickening agents prepared according to the invention and of their mixtures can be changed by the addition of low molecular weight alkoxylates, e.g. alcohol ethoxylates.

As a rule, the viscosity of a thickened aqueous system decreases as the temperature increases. By adding alkoxylates it is possible to reduce considerably the increase in the viscosity curve as a function of temperature, and within some ranges it is even possible to obtain a positive dependence, i.e. the viscosities increase as the temperature rises, which is especially significant for some fields of application. It is even possible to prepare mixtures in which, over a wide range, the viscosity is not dependent on temperature (see Table 5).

The thickening agents can be dissolved in aqueous systems at room temperature within a short period of time; a completely homogeneous system is already obtained after a few minutes' stirring (Examples 2 and 4), whereas for known thickening agents stirring periods of up to 1 hour are required before a homogeneous solution is attained.

The intrinsic viscosity of the thickening agents prepared according to the invention can be lowered by the addition of the alkoxylates mentioned hereinbefore, which has a favourable effect on the dosage of the thickening agents (see Table 4).

The invention will be further illustrated in the following examples:

EXAMPLES 1A AND 1B

Preparation of the Thickening Agent According to the Invention

The amounts used in Examples A and B and other product data can be found in Table 1.

First, the alcohol in the liquid state was mixed with KOH powder in an autoclave and dehydrated for 60 minutes at 100°–120° C. and a pressure of 10–15 Torr (mm Hg). Next, the vacuum was disconnected with nitrogen to a starting pressure of 0.4 bar. Then the ethylene oxide/propylene oxide mixture was fed in continuously at 150°–160° C. and 5 bar. After the ethylene oxide/propylene oxide mixture's reaction had been brought to completion, ethylene oxide was added at 150°–160° C. and 5 bar. After completion of the feeding of the ethylene oxide and following after-reaction the product was cooled and decanted.

Subsequently, the obtained liquid alkoxylate was charged into a dry three-neck flask flushed with nitrogen and fitted with a stirrer, a reflux condenser, a contact thermometer, a dropping funnel, a vacuum connection, and a nitrogen connection, and mixed with KOH powder. Then dehydration was carried out for 30 minutes at 120° C. and 10–15 Torr, whereupon the vacuum was disconnected with nitrogen. At 120° C. followed the addition of the diepoxide within 30 minutes. After having been stirred for 30 minutes at 120 C, the product was then cooled and decanted.

EXAMPLE 2

Prepared from the thickeners A and B according to Examples 1A and 1B were several concentrated aqueous solutions. The preparation was carried out by adding the liquid thickener to water and subsequent magnetic stirring.

At room temperature the stirring time was between 0.5 and 5 minutes, depending on the thickener and the concentration.

The viscosity of the solutions was determined in an Ubbelohde viscometer at 20° C. and at 40° C. The results can be found in Table 2.

EXAMPLE 3

From the thickeners A and B according to Examples 1A and 1B were prepared several mixtures in different ratios by simple stirring with a glass rod at room temperature.

These thickener mixtures were used according to Example 2 for the preparation of thickened aqueous solutions. The viscosities of these solutions at 20° C. and at 40° C. are to be found in Table 2.

EXAMPLE 4

With the thickeners A and B according to Examples IA and 1B was thickened in different amounts an ethylene glycol/water 1:1 mixture. The thickened solutions were prepared by the liquid thickener simply being stirred magnetically into the ethylene glycol/water mixture. At room temperature the stirring time was 0.5-1 minute, depending on the amount and the thickener.

The viscosity of the solutions was measured in an Ubbelohde viscometer at 20° C. and at 40° C. The results can be found in Table 3.

EXAMPLE 5

From the thickeners A and B according to Examples 1A and 1B were prepared several mixtures in different ratios by simple stirring with a glass rod.

With these thickener mixtures was thickened according to Example 4 an ethylene glycol/water 1:1 mixture. The viscosities of these solutions are to be found in Table 3.

EXAMPLE 6

From the thickeners A and B according to 1A and 1B a premix containing an alcohol with a low degree of ethoxylation was prepared.

The premix was prepared by simple stirring with a glass rod at room temperature. The intrinsic viscosity of the resulting premix is considerably lower than the viscosity of the pure thickener (see Table 4).

TABLE 1

Amount and Product Data for Two Selected Thickener Examples A and B
$R(EO/PO)_{a/b}(EO)_c$-Y-$(EO)_c(EO/PO)_{a/b}R$

|  | A | B |
| --- | --- | --- |
| R (alcohol) | tallow | lauryl myristyl |
| amount of alcohol (g) | 260.5 | 193.5 |
| catalyst: KOH (g) | 0.79 | 0.79 |
| (EO/PO): a/b | 66/14 | 66/14 |
| (EO/PO) (g) | 2908/813 | 2908/813 |
| EO: c | 10 | 10 |
| EO (g) | 440 | 440 |
| alkoxylate: |  |  |
| molecular weight | 4422 | 4355 |
| cloud point (°C.) (1% in water) | 83-84 | 83-84 |
| alkoxylate (g): | 1000 | 1000 |
| catalyst: KOH (g) | 4 | 4 |
| Y = diepoxide (g) | vinyl cyclohexene dioxide 26.2 | vinyl cyclohexene dioxide 26.6 |
| alkoxylate/diepoxide (mole:mole) | 2:1.65 | 2:1.65 |
| thickener |  |  |
| cloud point (°C.) (1% in water) | 60 | 60 |
| viscosity at 20° C. (cSt) | 6300 | 6300 |

TABLE 2

Concentration-viscosity (in cSt) profile of A and B and their mixtures in $H_2O$

| Weight % | A 100% 20° C. | + B 0% 40° C. | A 75% 20° C. | + B 25% 40° C. | A 50% 20° C. | + B 50% 40° C. | A 25% 20° C. | + B 75% 40° C. | A 0% 20° C. | + B 100% 40° C. |
| --- | --- | --- | --- | --- | --- | --- | --- | --- | --- | --- |
| 5 | 331 | 25 | — | — | 34 | 8 | — | — | 17 | 6 |
| 5.3 | 590 | 40 | 145 | 16 | 55 | 11 | 30 | 8 | 22 | 7 |
| 5.8 | — | — | 340 | 31 | — | — | — | — | — | — |
| 6 | — | — | 470 | 42 | — | — | — | — | — | — |
| 6.7 | 2700 | 190 | — | — | 275 | 36 | — | — | 55 | 15 |
| 6.8 | — | — | 1200 | 99 | 309 | 40 | 97 | 21 | 58 | 16 |
| 7.6 | — | — | — | — | — | — | 182 | 36 | — | — |
| 7.8 | — | — | — | — | — | — | 215 | 42 | — | — |
| 8 | 8500 | 650 | — | — | 935 | 106 | — | — | 109 | 29 |
| 8.7 | 17000 | 1600 | 6200 | 555 | 1530 | 175 | 356 | 68 | 150 | 40 |

TABLE 3

Concentration-viscosity (in cSt) profile of A and B and their mixtures in 1:1 ethylene glycol-water

| Weight % | A 100% 20° C. | + B 0% 40° C. | A 75% 20° C. | + B 25% 40° C. | A 50% 20° C. | + B 50% 40° C. | A 25% 20° C. | + B 75% 40° C. | A 0% 20° C. | + B 100% 40° C. |
| --- | --- | --- | --- | --- | --- | --- | --- | --- | --- | --- |
| 6 | 180 | 34 | — | — | — | — | — | — | — | — |
| 6.2 | 215 | 39 | — | — | — | — | — | — | — | — |
| 6.25 | 220 | 40 | 108 | 25 | — | — | 36 | 12 | — | — |
| 7.8 | — | — | 295 | 56 | — | — | — | — | — | — |
| 8 | 700 | 110 | — | — | 156 | 36 | — | — | 47 | 16 |
| 8.3 | — | — | — | — | 177 | 40 | 83 | 24 | — | — |
| 10 | 1700 | 270 | — | — | 350 | 74 | 160 | 43 | 83 | 26 |
| 12 | — | — | 1600 | 270 | 690 | 136 | 280 | 70 | 130 | 40 |
| 12.5 | — | — | — | — | — | — | — | — | 146 | 44 |
| 12.7 | — | — | — | — | — | — | — | — | 153 | 46 |

EXAMPLE 7

Using the thickener/alkoxylate mixtures prepared according to Example 6 several concentrated aqueous solutions were prepared.

The thickened solutions were prepared by the premix simply being stirred magnetically into water. At room temperature the stirring time was 0.5-3 minutes.

The viscosity of the solutions was measured in an Ubbelohde viscometer at 20° C. and 40° C. The results have been compiled in Table 5.

TABLE 4

Viscosity of Thickener A and Its Mixture with an Alcohol with a Low Degree of Ethyoxylation
(LM 60: $C_{12/14}H_{25/29}O(CH_2CH_2O)_6H$)

|  | A | A + LM 60 1:1 |
| --- | --- | --- |
| Viscosity at 20° C. | 6.300 cSt | 670 cSt |

TABLE 5

Effect of an Alcohol with a Low Degree of Ethoxylation on the Viscosity-Temperature Profile of the Thickeners A and B in Water
(LM 60: $C_{12/14}H_{25/29}O(CH_2CH_2O)_6H$)

| | | Viscosity in Centistokes at | |
|---|---|---|---|
| % A | % LM 60 | 20° C. | 40° C. |
| 2.6 | — | 3.1 | 1.6 |
| — | 2.6 | 1.6 | 5.8 |
| 2.6 | 2.6 | 78 | 27 |
| 5.2 | — | 300 | 23 |
| 1.95 | 3.25 | 28 | 66 |
| % B | % LM 60 | 20° C. (cSt) | (40° C.) cSt |
| 4 | — | 8 | 3.3 |
| — | 4 | 2.2 | 12 |
| 4 | 4 | 73 | 45 |
| 8 | — | 110 | 29 |
| 3 | 5 | 17 | 16 |

We claim:

1. A process for the preparation of thickening agents for aqueous systems by the conversion of higher aliphatic alcohols having 8–22 carbon atoms with ethylene oxide and propylene oxide and the reaction of the resulting alkoxylated alcohols with diepoxides, the process comprising (a) reacting the aliphatic alcohols having 8–22 carbon atoms with an alkylene oxide mixture of ethylene oxide/propylene oxide to produce polyether, the alkylene oxide mixture containing more than 15% by weight of propylene oxide in a molar ratio of alcohol to the alkylene oxide mixture of 1:40–1:150, (b) reacting the polyether with 5–20 moles of ethylene oxide to produce an alkoxylation product and (c) reacting the alkoxylation product with a diepoxide in a ratio of 0.5–3 moles of alkoxylation product per mole of diepoxide.

2. A process according to claim 1 wherein the ratio of moles of alkoxylation product per mole of diepoxide is in the range of 1–1.5:1.

3. A process according to claim 1 wherein the diepoxide used is vinyl cyclohexene dioxide.

4. A process according to claim 1 wherein the diepoxide used is 1,2,7,8-diepoxy octane.

5. A process according to claim 1 wherein the alkylene oxide mixture of ethylene oxide/propylene oxide is 20–30% by weight propylene oxide.

6. A process according to claim 1 further comprising (d) mixing the product of step (c) with 0.1–5 parts of low molecular weight alcohol ethoxylate.

7. A thickening agent comprised of the product of the process of claim 1.

8. A thickening agent comprised of the product of the process of claim 6.

9. A thickened aqueous system comprised of an aqueous fluid and the thickening agent of claim 7.

10. A thickened aqueous system comprised of an aqueous fluid and the thickening agent of claim 8.

11. A thickened aqueous hydraulic fluid comprised of an aqueous hydraulic fluid and the thickening agent of claim 7.

12. A thickened aqueous hydraulic fluid comprised of an aqueous hydraulic fluid and the thickening agent of claim 8.

13. A thickening agent comprised of a first product of the process of claim 1 and a second product of the process of claim 1, the first product produced from a first aliphatic alcohol and the second product produced from a second aliphatic alcohol.

14. A thickening agent comprised of a first product of the process of claim 6 and a second product of the process of claim 6, the first product produced from a first aliphatic alcohol and the second product produced from a second aliphatic alcohol.

* * * * *